United States Patent [19]
Braun et al.

[11] Patent Number: 4,766,992
[45] Date of Patent: Aug. 30, 1988

[54] COAL CONVEYOR CONSTRUCTION

[75] Inventors: Gert Braun; Ernst Braun, both of Essen-Heisingen, Fed. Rep. of Germany

[73] Assignee: Halbach & Braun Industrienlagen, Fed. Rep. of Germany

[21] Appl. No.: 936,819

[22] Filed: Dec. 2, 1986

[30] Foreign Application Priority Data

Dec. 14, 1985 [DE] Fed. Rep. of Germany ....... 3544274

[51] Int. Cl.$^4$ ............................................. B65G 47/76
[52] U.S. Cl. ................................... 198/599; 198/606; 299/64
[58] Field of Search ................... 299/43, 64; 198/606, 198/607, 560, 517, 599

[56] References Cited

U.S. PATENT DOCUMENTS

| 3,367,717 | 2/1968 | Rösler et al. | 299/34 |
| 4,586,753 | 5/1986 | Braun et al. | 299/43 |
| 4,673,079 | 6/1987 | Grundken et al. | 198/606 X |

Primary Examiner—Jerome Massie
Assistant Examiner—Matthew Smith
Attorney, Agent, or Firm—McGlew and Tuttle

[57] ABSTRACT

Apparatus for hauling mined coal in a subsurface mining operation with a longwall conveyor, a drift conveyor and a cross frame with stripper for the connection of the longwall conveyor with the drift conveyor. The longwall conveyor and the drift conveyor are designed as chain scraper conveyors and include a conveyor trough with trough bottom and trough sidecheeks, pushers guided in the sidecheeks, and at least one pull chain with which the pushers are connected and which runs in the region of the trough center at least in the case of the longwall conveyor. On the side away from the lateral discharge, the pushers are guided in a guide trough continuing the associated trough sidecheek. A track-in device for disengaged pushers of the longwall conveyor running with one arm on the trough sidecheek is provided, which comprises a track-in cutout in the trough sidecheek. The track-in device is disposed in a hauling direction directly before the stripper and comprises, beginning in the region of the track-in cutout, a lowered trough bottom which leads via a trough sidecheek cutout into the drift conveyor. A stripper acts as an engaging element which covers the lowered trough bottom toward the guide rail and the guide rail connects with the level of the lowered trough bottom via a step passable by the pushers or via an appropriate transition.

2 Claims, 6 Drawing Sheets

COAL CONVEYOR CONSTRUCTION

FIELD AND BACKGROUND OF THE INVENTION

This invention relates in general to mining devices and in particular to a new and useful apparatus for handling coal and for transferring it from a longwall conveyor to a drift conveyor.

In invention relates particularly to an apparatus for hauling mined coal in a subsurface mining operation, with a longwall conveyor, a drift conveyor, a cross frame for the "haul-technological" connection of the longwall conveyor with the drift conveyor.

The longwall conveyor and the drift conveyor are designed as chain scraper conveyors including a conveyor trough with a trough bottom and trough sidewalls or cheeks, or pushers guided in the sidecheeks, and at least one pull chain, with which pull chain the pushers are connected and which at least in the longwall conveyor runs in the region of the conveyor trough center. The cross frame for the longwall conveyor has a plowshare type stripper extended in the region of the connected drift conveyor in the direction of the conveyor trough of the longwall conveyor and crosswise thereto, and ascending in hauling direction. The stripper transfers the coal brought along by the longwall conveyor to the drift conveyor via a lateral discharge and this can be underrun by the chain as well as by the pushers of the longwall conveyor. The pushers are guided on their side away from the lateral discharge in an ascending guide trough continuing the associated trough sidechecks. A track-in device for disengaged pushers of the longwall conveyor have one arm on the trough sidecheek and it comprises a track-in cutout in the trough sidecheek. It is clear that, in the region of the cross frame, a track-in device is required only for the side of the longwall conveyor away from the lateral discharge, because on the other side disengaged pushers get to the hauling level via the lateral dicharge. For such devices generally a driving or turn around station is arranged directly behind the cross frame.

In the apparatus of the species known (from the practice), the track-in device is at some distance before the stripper or directly at the stripper itself. It comprises merely the track-in cutout in the respective trough sidecheek. A disengaged pusher of the longwall conveyor, which therefore runs with one arm on the trough sidecheek, falls, as it were, into the track-in cutout and therewith back on the guiding level of the trough sidecheek, which in that respect operates as a guide rail. This, however, cannot occur if coal and/or rock have pushed under the disengaged pushers, preventing pusher then passes by the track-in cutout. It gets on the trough sidecheek into the region of the stripper and onto the stripper, while the chain to which it is connected comes under the stripper. This leads to disturbances in operation which are costly to eliminate, and possibly breakage may result.

SUMMARY OF THE INVENTION

The invention provides an apparatus which avoids the described operational distrubances and is constructed so that a disengaged pusher in the region of the cross frame can no longer get under the stripper.

Accordingly, the invention teaches the track-in device arranged in a hauling direction directly before the stripper and has, starting in the region of the track-in cutout, a lowered trough bottom which via a trough sidecheek cutout leads into the drift conveyor. Also the stripper acts as an engaging element which covers the lowered trough bottom toward the guide rail and the guide rail is connected with the level of the lowered trough bottom via a step passable by the pushers or via an appropriate transition.

In the apparatus according to the invention, a disengaged pusher can enter into the track-in cutout also when coal and/or rock have pushed under the pusher. The trough bottom, in fact, is lowered accordingly and at any rate so far the pusher gets sufficiently deep into the track-in cutout. Besides, the invention utilizes the stripper, extended toward the longwall conveyor if desired, as a structural part of the track-in device. A stripper region forms an upper guide for the pusher having entered the track-in cutout and it introduces the pusher securely into the guide rail of the cross frame, because the step, inevitable for structural reasons, is adapted accordingly, or is, for example, designed as an inclined transitional region.

Accordingly it is an object of the invention to provide an improved conveyor construction for handling coal and similar mining materials which includes a transfer arrangement arranged between a longwall and a drift conveyor.

A further object of the invention is to provide a conveyor construction which is simple in design, rugged in construction and economical to manufacture.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
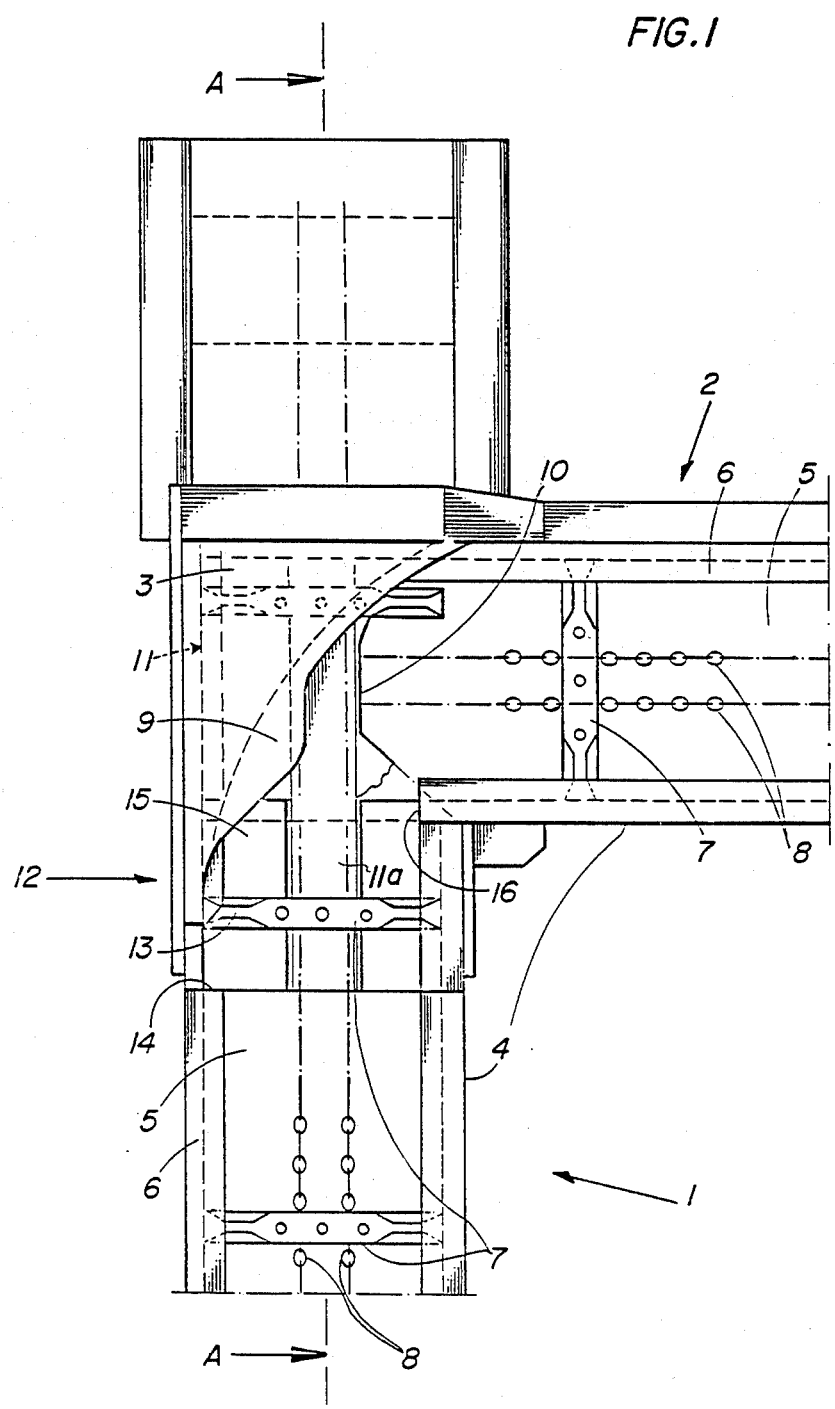
FIG. 1 is a top plan view partly broken away of an apparatus for hauling mined coal constructed in accordance with the invention.

Referring to the drawings in particular the invention embodied therein comprises a conveyor construction which includes an arrangement for transferring material from a longwall conveyor 1 to a drift conveyor generally designated 2.

Figure 3:
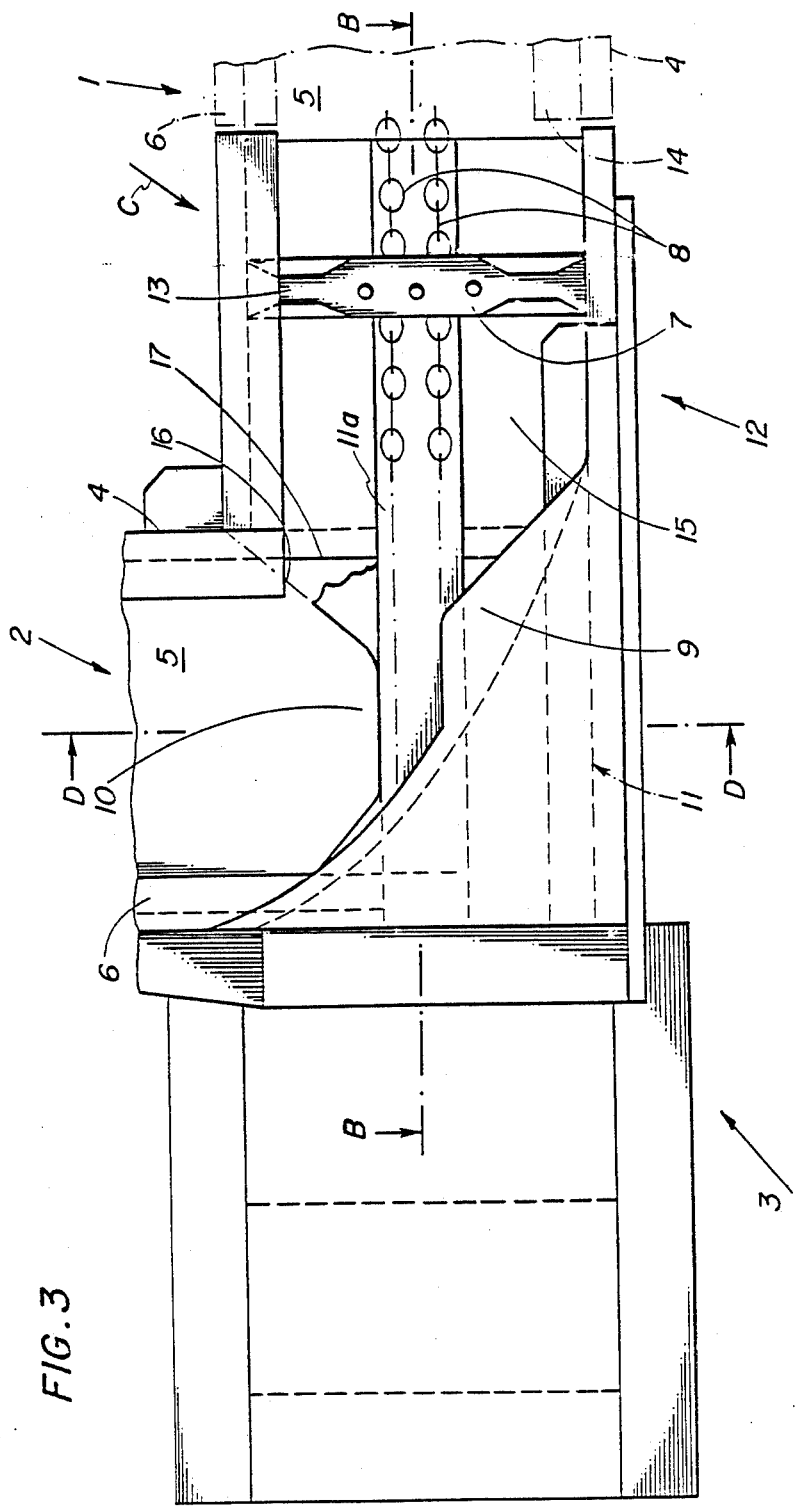
FIG. 3 is a top plan view of the device shown in FIG. 2.
Figure 4:
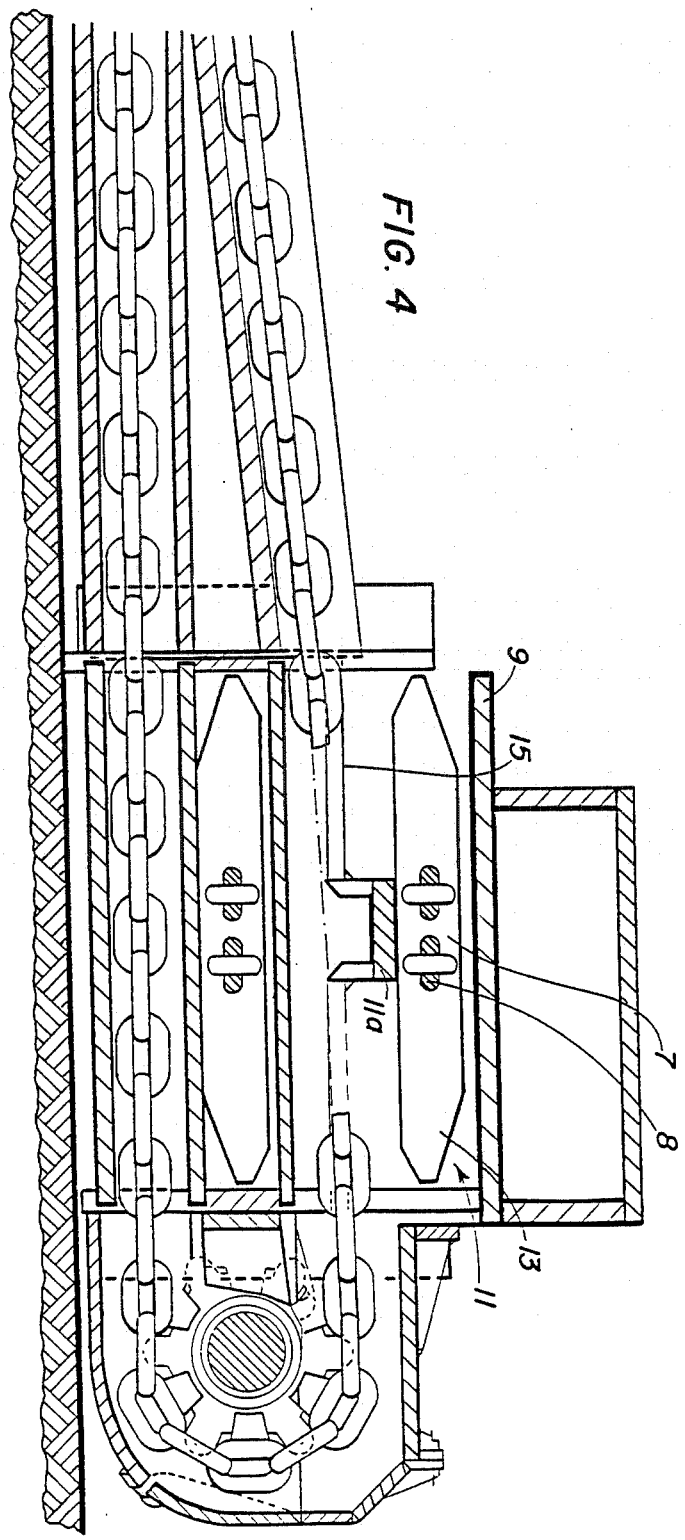
FIG. 4 is a sectional view taken in the direction of line B—B of FIG. 3.
Figure 5:
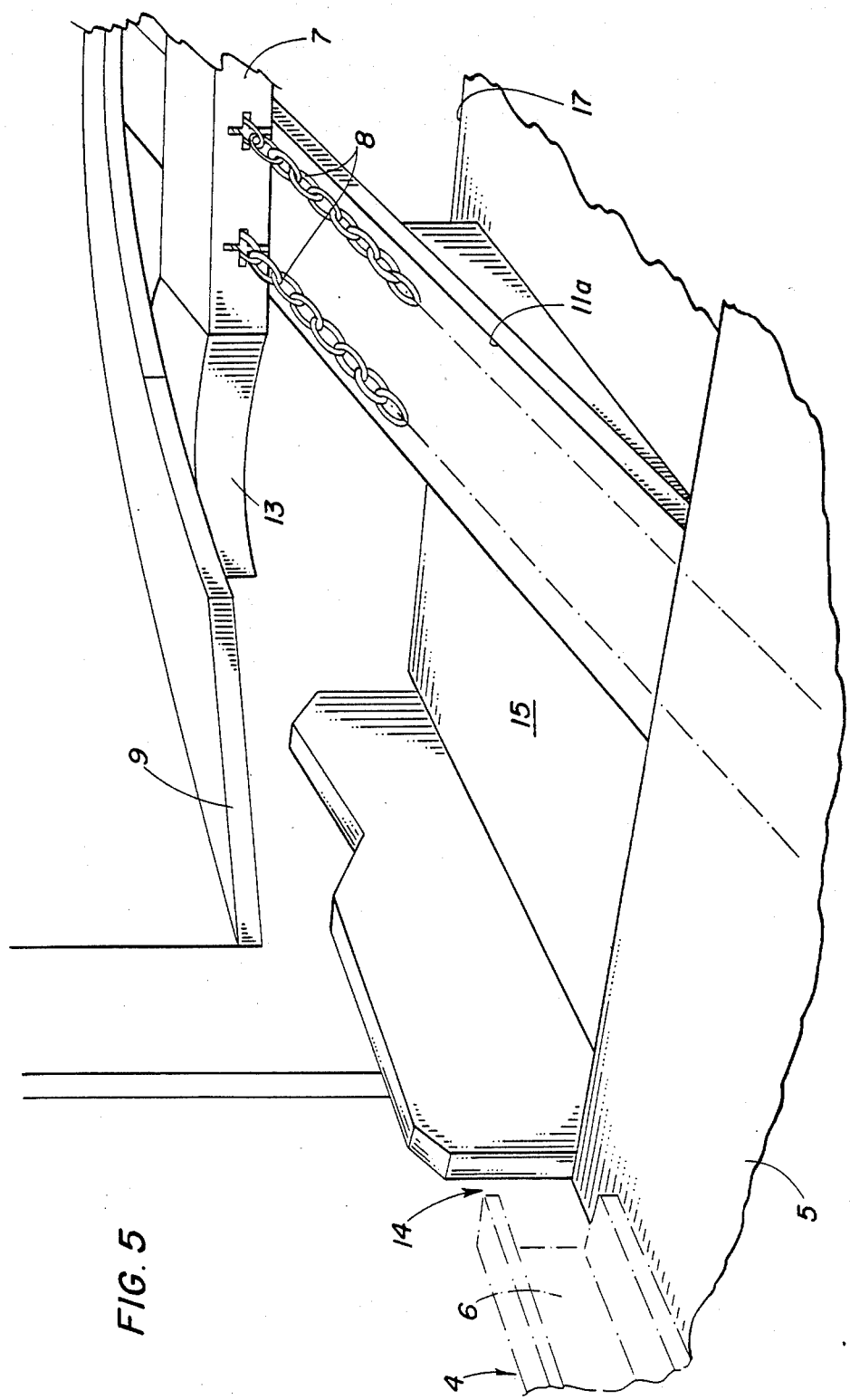
FIG. 5 is a perspective view taken in the direction of arrow C in FIG. 3.
Figure 6:
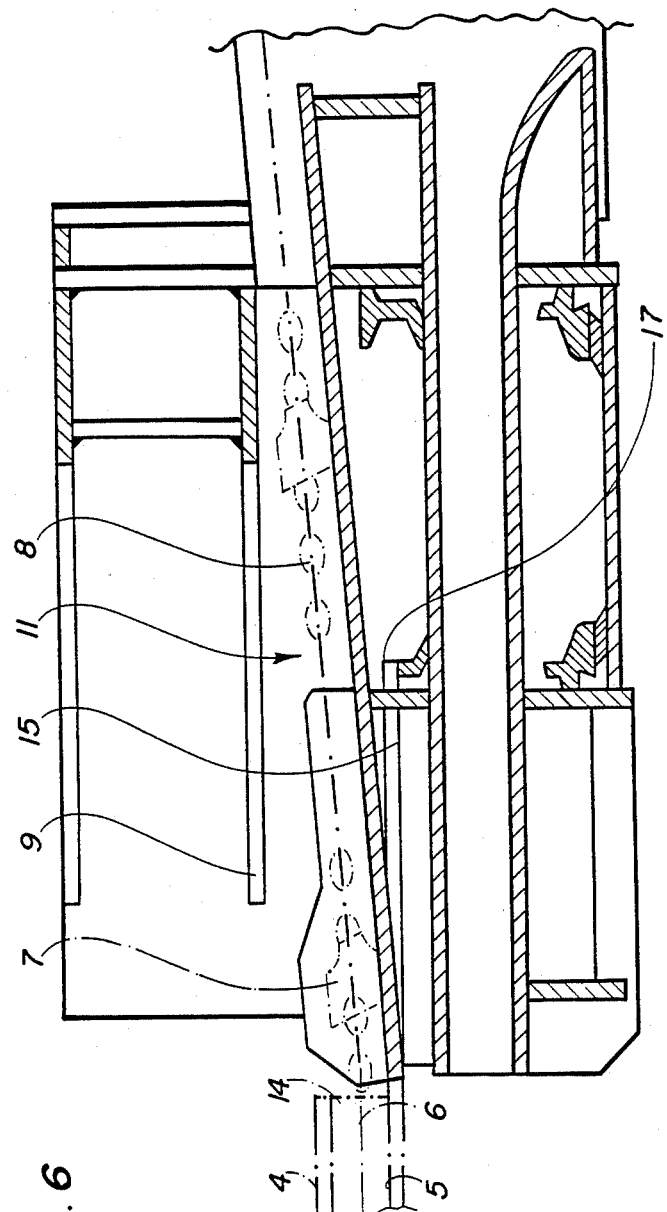
FIG. 6 is a sectional view taken in the direction of line D—D of FIG. 3.

The apparatus illustrated in the figures serves for the hauling of mined coal in a subsurface mining operation. In its basic construction it comprises a longwall conveyor 1, a drift conveyor 2, and a cross frame 3 for the hauling technological connection of the longwall conveyor 1 with the drift conveyor 2. The longwall conveyor 1 and the drift conveyor 2 are drawn only in part. The longwall conveyor 1 and the drift conveyor 2 are designed as chain scraper conveyors. They comprise, therefore, a conveyor trough 4 with a trough bottom 5 and trough sidecheeks, or side walls 6. Pushers 7 are guided in the trough sidecheeks 6 and connected to at least one of two pull chains 8,8. In the embodiment example and according to a preferred form of the invention, two pull chains 8 are provided, which, in the longwall conveyor 1 run in the region of the conveyor trough center. The cross frame 3 comprises,for the longwall conveyor 1, a stripper 9 ascending in the hauling direction and extended in the region of the connected drift conveyor 2 in the direction of the conveyor trough 4 of the longwall conveyor 1 and crosswise thereto, which stripper is designed in the form of a plowshare. In this respect reference is made in particular to FIG. 1 and 3. The coal brought along by the longwall conveyor 1 is transferred by the stripper 9 via a lateral discharge 10 to the drift conveyor 2. The stripper 9 can be underrun by the chains 8 of the longwall conveyor 1 as well as by the pushers or drivers 7 of the longwall conveyor 1. The pushers are guided on the side away from the lateral discharge 10 in a guide rail generall designated 11 including central ascending bottom plate 11a continuing the associated trough sidecheek 6. In addition, a track-in device 12 is provided. It serves to reintroduce disengaged pushers 7 of the longwall conveyor 1, running by one arm 13 on the trough sidecheek, into the trough sidecheek 6 and into the connected guide rail 11 of the cross frame 3. To this end a track-in and cutout 14 is provided in the trough sidecheek 6. It is locted on the side opposite the lateral discharge 10.

The track-in device 12 is arranged in a hauling direction directly before the stripper 9. It comprises further, starting in the region of the track-in cutout 14, a lowered trough bottom 15 which leads via a trough sidecheek cutout 16 of the drift conveyor 2 into the conveyor. Besides, the stripper 9 performs a new and additional function. The arrangement is made so that the stripper 9 provides an engaging element to the guide rail 11 which covers the lowered trough bottom 15, the guide rail 11 connecting with the level of the lowered trough bottom 15 via a step 17 passable by the pushers 7 or via an appropriate transition.

Figure 2:
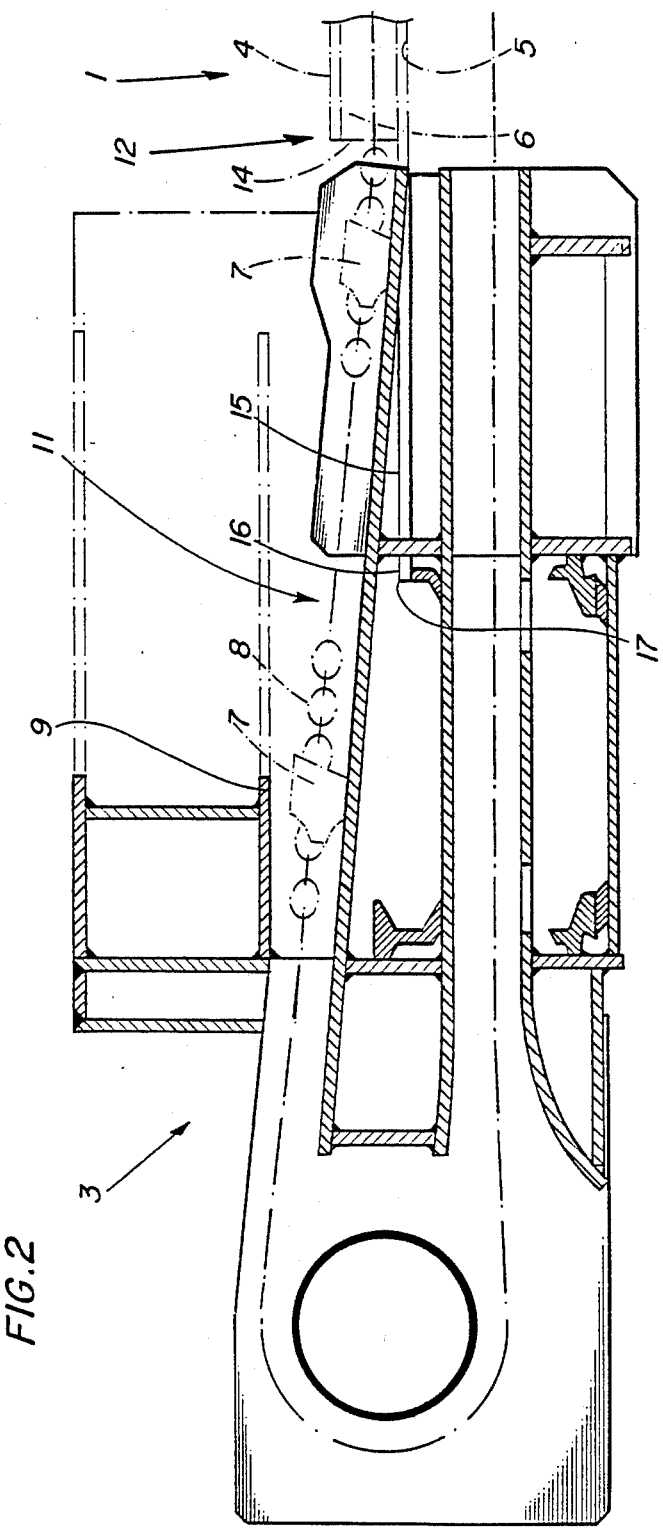
FIG. 2 is, on a scale larger than FIG. 1, a section taken along line A—A of FIG. 1.

If a disengaged pusher 7 of the longwall conveyor 1, under which coal and/or rock have compacted, gets into the region of the track-in device 12, this pusher 7 can enter into the track-in cutout 14 by its arm 13, which because of the disengagement runs on the trough sidecheek 6, because the trough bottom 15 is lowered so far that the rock or coal present under this pusher 7 no longer interfere. Consequently, this pusher arm 13 is covered by the stripper 9 as an engaging element and is sure to get into the guide rail 11 of the cross frame 3, as has been indicated in dash-dot lines in FIG. 2.

While specific embodiments of the invention have been shown and described in detail to illustrate the application of the principles of the invention, it will be understood that the invention may be embodied otherwise without departing from such principles.

What is claimed is:

1. In an apparatus for hauling mined coal in a subsurface mining operation which includes a longwall conveyor, a drift conveyor, a cross frame for connection of the longwall conveyor with the drift conveyor, said longwall conveyor and said drift conveyor being chain scraper conveyors having a conveyor trough with a trough bottom and trough sidecheeks on respective sides of said bottom, a plurality of pushers guided in said sidecheeks, at least one pull chain, said pushers being connected to said chain at spaced locations along said chain and said pushers being guided in the longwall conveyor in said sidecheeks, said longwall conveyor chain running in the region of the conveyor trough center, the improvement comprising a plowshare type stripper on said cross frame extending into said drift conveyor in a direction of the conveyor trough of the longwall conveyor and crosswire to the conveyor trough, a lateral discharge on said longwall conveyor, said stripper being underrun by the chain and being underrun by the pushers of said longwall conveyor, said stripper transferring coal brought along by said longwall conveyor to said drift conveyor via said lateral discharge, an ascending guide rail continuing with the associated trough sidecheeks of said longwall conveyor, said pushers being guided on the side away from said lateral discharge in said ascending guide rail, a track-in device for said pushers of said longwall conveyor, said pushers having an arm running on the trough side cheek, said sidecheek having a track-in cutout at a location before said stripper, said track-in device comprising in the region of the track-in cutout a lowered trough bottom which leads via a trough sidecheek cutout into said drift conveyor, said guide rail connected between the longwall conveyor trough bottom and the level of the lowered trough bottom via a step, said stripper comprising an engaging element covering said lowered trough bottom adjacent said guide rail.

2. An apparatus for the transport of mined coal in a subsurface mining operation, comprising: a longwall conveyor, a drift conveyor, and a cross-frame for the transfer of material from the longwall conveyor to the drift conveyor, each of the longwall conveyor and the drift conveyor being chain scraper conveyors with a trough bottom, trough sidecheeks, drivers guided in the sidecheeks, and at least one pull chain, the longwall conveyor pull chain being connected to the longwall drivers, said cross frame including a plowshare-type scraper extending in the region of the connected drift conveyor, said scraper extending in the direction of the conveyor trough of the longwall conveyor and perpendicular thereto, said scraper adapted to transfer coal hauled by the longwall conveyor to the drift conveyor via a lateral discharge while simultaneously allowing the longwall chain and the longwall drivers of the longwall conveyor to run under said scraper; a guide rail for guiding the drivers on the side away from the lateral discharge, the guide rail ascending with the associated trough sidecheeks of said longwall conveyor, a tracking-in device including a tracking-in cutout in the trough sidecheek, said tracking-in cutout being formed upstream of said scraper, said tracking-in device including a lowered trough bottom which leads via said trough sidecheek cutout into said drift conveyor, said scraper acts as engaging element adjacent the guide rail overlapping the lowered trough bottom, said guide rail connecting the level of the lowered trough bottom by a step passable by the drivers.

* * * * *